(12) United States Patent
Sakai

(10) Patent No.: US 9,678,305 B2
(45) Date of Patent: Jun. 13, 2017

(54) INNER FOCUS LENS

(71) Applicant: TAMRON CO., LTD., Saitama-shi, Saitama (JP)

(72) Inventor: Takahiko Sakai, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 96 days.

(21) Appl. No.: 14/565,705

(22) Filed: Dec. 10, 2014

(65) Prior Publication Data

US 2015/0247989 A1 Sep. 3, 2015

(30) Foreign Application Priority Data

Feb. 28, 2014 (JP) ................... 2014-039818

(51) Int. Cl.
| | | |
|---|---|---|
| *G02B 9/62* | (2006.01) | |
| *G02B 9/60* | (2006.01) | |
| *G02B 27/64* | (2006.01) | |

(52) U.S. Cl.
CPC ............. *G02B 9/62* (2013.01); *G02B 9/60* (2013.01); *G02B 27/646* (2013.01)

(58) Field of Classification Search
CPC ...... G02B 27/64; G02B 27/646; G02B 15/00; G02B 15/14; G02B 15/15; G02B 15/163; G02B 15/167; G02B 15/17; G02B 15/20–15/26; G02B 13/02; G02B 9/12; G02B 9/34–9/56; G02B 9/60–9/62; G02B 9/64; G03B 2205/0007–2205/0015; G03B 2205/0046; H04N 5/23264; H04N 5/2328; H04N 5/23287
See application file for complete search history.

(56) References Cited

U.S. PATENT DOCUMENTS

| | | |
|---|---|---|
| 5,579,172 A | 11/1996 | Aoki et al. |
| 6,084,721 A | 7/2000 | Terasawa |

(Continued)

FOREIGN PATENT DOCUMENTS

| | | |
|---|---|---|
| CN | 105093505 A | 11/2015 |
| EP | 1 148 369 A2 | 10/2001 |
| JP | 2013-097212 A | 5/2013 |

OTHER PUBLICATIONS

Refractive Index Database, http://www.refractiveindex.info, Optical constants for LASF9 and SF5 Schott glasses, accessed Jul. 18, 2016.*

(Continued)

*Primary Examiner* — Derek S Chapel
*Assistant Examiner* — Adam W Booher
(74) *Attorney, Agent, or Firm* — Foley & Lardner LLP

(57) ABSTRACT

An inner focus lens includes sequentially from an object side, a first lens group having a positive refractive power; a second lens group having a negative refractive power; and a third lens group having a negative refractive power. The second lens group is moved along the optical axis, whereby focusing from a focus state for an object at infinity to a focus state for a minimum object distance is performed. The inner focus lens satisfies a conditional expression (1) $-29.0 \leq f3/f \leq -5.4$, where f3 is a focal length of the third lens group at the focus state for an object at infinity and f is a focal length of the optical system overall at the focus state for an object at infinity.

9 Claims, 6 Drawing Sheets

(56) References Cited

U.S. PATENT DOCUMENTS

| | | | | |
|---|---|---|---|---|
| 6,650,475 B1* | 11/2003 | Hamano | .............. | G02B 27/646 |
| | | | | 359/554 |
| 2012/0229900 A1* | 9/2012 | Adachi | ................. | G02B 13/18 |
| | | | | 359/557 |
| 2012/0327289 A1* | 12/2012 | Souma | ................... | G02B 13/02 |
| | | | | 348/345 |
| 2015/0323764 A1 | 11/2015 | Mori | | |

OTHER PUBLICATIONS

USPTO Office Action, U.S. Appl. No. 14/565,777, Aug. 1, 2016, 19 pages.
Chinese Office Action and partial English translation, Sep. 26, 2016, 10 pages.
USPTO Office Action, U.S. Appl. No. 14/565,777, Feb. 8, 2017, 20 pages.

* cited by examiner

FIG. 2
FIRST EMBODIMENT
(FOCUS STATE FOR OBJECT AT INFINITY)
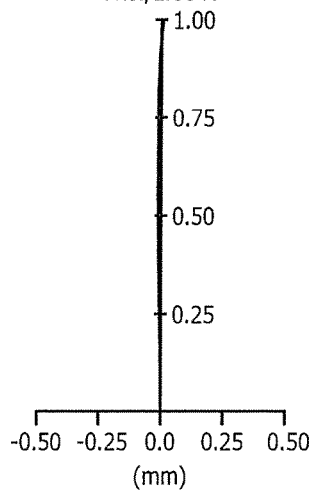
SPHERICAL ABERRATION
Fno./2.8840
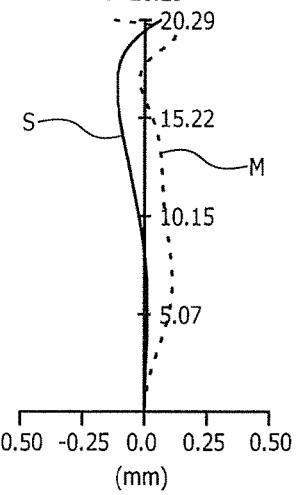
ASTIGMATISM
Y=20.29
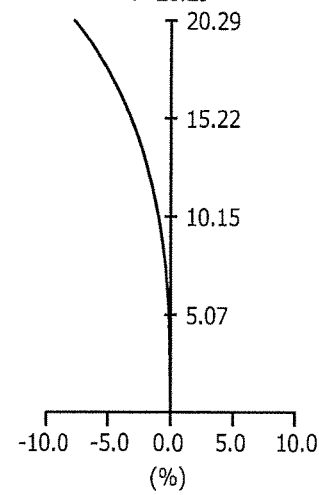
DISTORTION
Y=20.29
(FOCUS STATE FOR MINIMUM OBJECT DISTANCE)
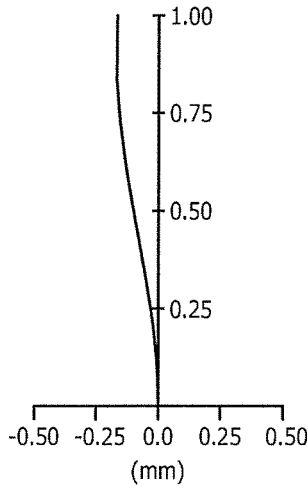
SPHERICAL ABERRATION
Fno./2.8985
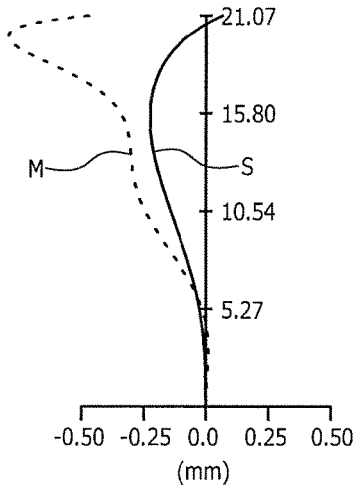
ASTIGMATISM
Y=21.07
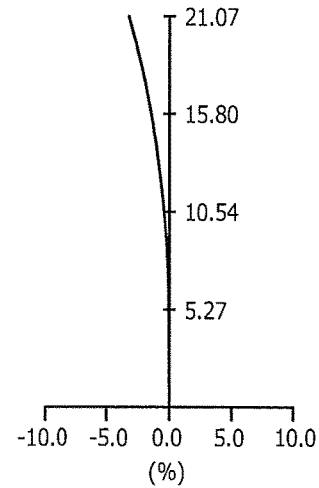
DISTORTION
Y=21.07

FIG.4
SECOND EMBODIMENT
(FOCUS STATE FOR OBJECT AT INFINITY)
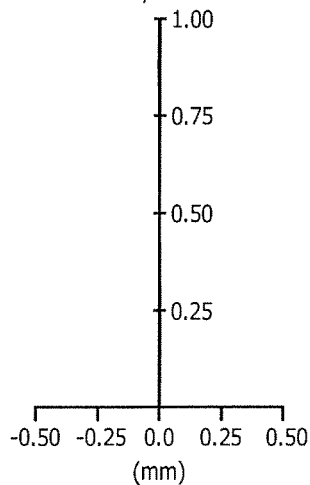
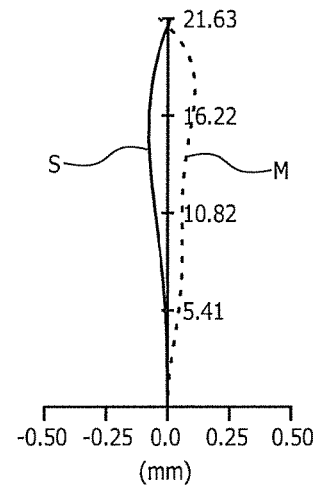
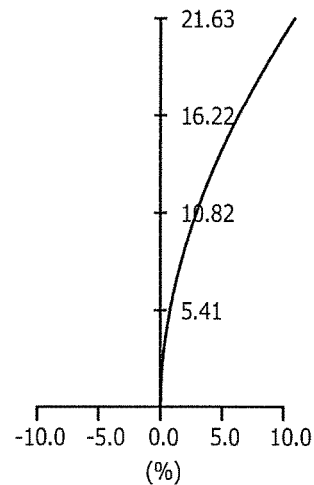
(FOCUS STATE FOR MINIMUM OBJECT DISTANCE)
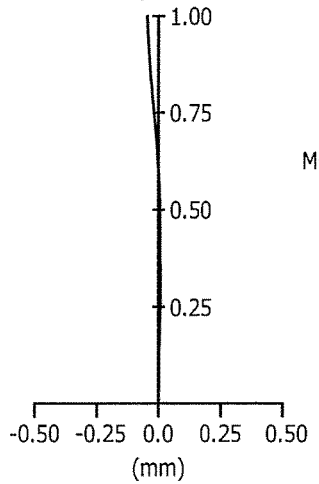
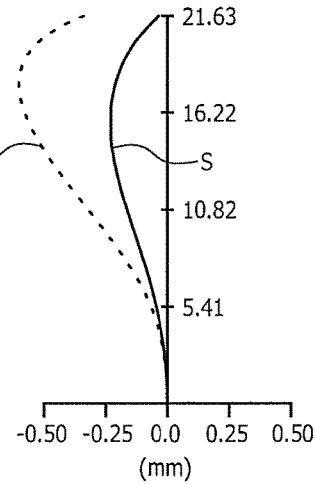
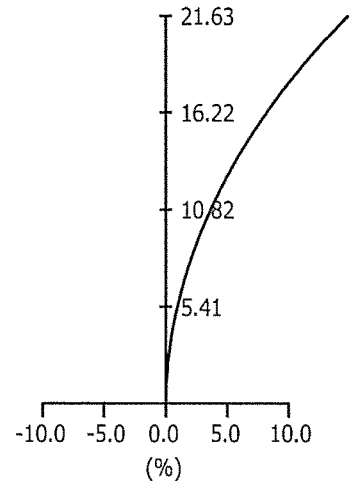

FIG.6
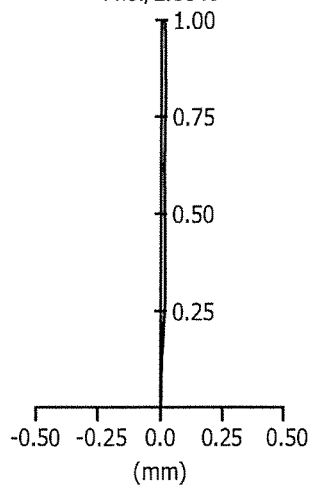
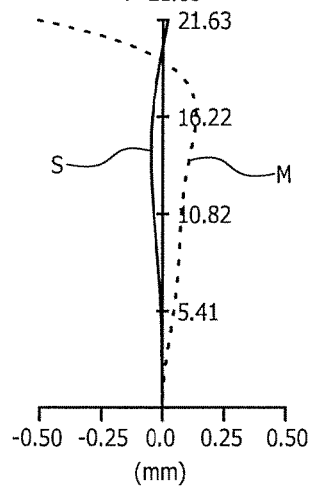
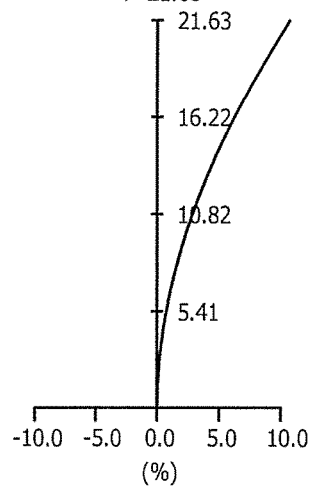
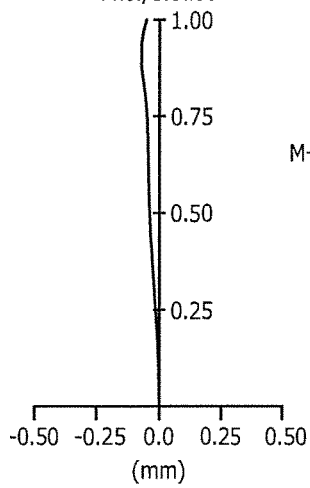
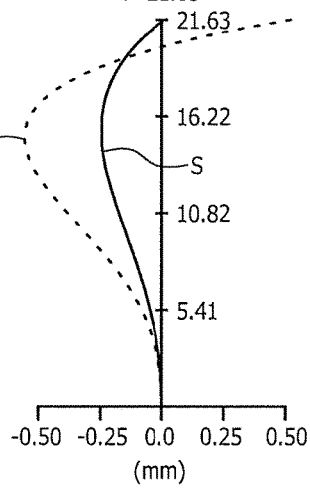
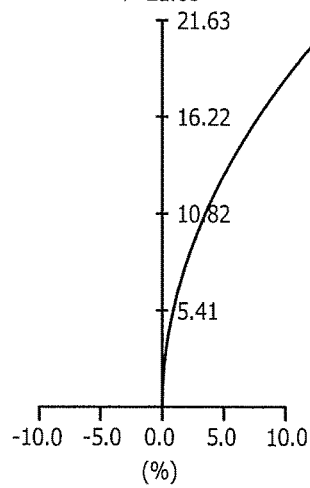

INNER FOCUS LENS

BACKGROUND OF THE INVENTION

1. Field of the Invention

The present invention relates to a compact inner focus lens having high imaging performance.

2. Description of the Related Art

Conventionally, a long flange focal length relative to the focal length has to be established and thus, many lenses for single-lens reflex cameras adopt a configuration that includes a positive lens group toward the rear of the optical system to easily establish back focus. Nonetheless, in recent years, camera bodies have decreased in size and consequent to the spread of digital cameras, instances where a long flange focal length is not necessary are increasing.

Further, since video filming is also possible by a digital camera, high-speed autofocus processing for video filming is desirable. A portion of a lens group (focusing group) is moved rapidly along the optical axis (wobble) to achieve transitions: a non-focused state→focused state→non-focused state. A signal component of a specific frequency band of a partial image area is detected from the output signal of the image sensor; an optimal position of the focusing group achieving a focused state is determined; and the focusing group is moved to the optimal position. In particular, with video filming, this series of operations has to be rapidly continued, repeatedly. Further, in the execution of wobble, rapid driving of the focusing group has to be possible and the focusing group is demanded to have the smallest diameter possible and to be light-weight.

To address such demands, an inner focus lens that can also sufficiently cope with video filming has been proposed (for example, refer to Japanese Patent Application Laid-Open Publication No. 2013-97212).

The inner focus lens disclosed in Japanese Patent Application Laid-Open Publication No. 2013-97212 has a medium telephoto focal length by a 35 mm film camera conversion and a small, light-weight focusing group internally, thereby enabling favorable wobble to be executed.

On the other hand, conventionally, at the image sensor that optically receives and converts an optical image into an electronic image signal, there are limitations for efficiently taking in incident light by the on-chip microlens, etc. and on the lens side, the exit pupil is made to be greater than a certain diameter and assured telecentricity of the luminous flux incident to the image sensor is desirable.

Nonetheless, with recent image sensors, improved aperture ratios and advances in the design freedom of on-chip microlenses have reduced the exit pupil limitations demanded on the image lens side. Furthermore, with recent software and camera system advances and improvements, even when distortion is significant to an extent that conventionally, the distortion would be conspicuous, correction by image processing has become possible.

Therefore, in conventional image lenses, although a positive lens element is disposed farthest on the image side of the optical system and telecentricity is assured, in recent years, this is no longer necessary and even when a negative lens element is disposed farthest on the image side of the optical system and there is oblique incidence of the luminous flux on the image sensor, vignetting (shading) consequent to mismatching of the on-chip microlens and pupil, etc. has become inconspicuous. Further, since a negative lens element can now be disposed farthest on the image side of an optical system, reductions in the diameter of optical systems can be expected.

In contrast, with the inner focus lens disclosed in Japanese Patent Application Laid-Open Publication No. 2013-97212, since a positive lens element is disposed farthest on the image side of the optical system, which has a shorter overall length, the diameter of the third lens group (lens farthest on the image side) cannot be sufficiently reduced. Therefore, provision of an inner focus lens for cameras having a smaller dimension along the direction of the diameter of the optical system is difficult, including for mirrorless interchangeable-lens cameras that have come into wide use. Furthermore, when focusing is performed, to suppress aberration variations consequent to wobble and the effects of magnification, disposal of a negative element farthest on the image side of the optical system is desirable.

The inner focus lens disclosed in Japanese Patent Application Laid-Open Publication No. 2013-97212 is not aimed for wide angle views and therefore, the correction of field curvature and distortion as well as assuring the amount of light at lens edges necessary for wide angle views are points that have not been considered.

SUMMARY OF THE INVENTION

It is an object of the present invention to at least solve the above problems in the conventional technologies.

An inner focus lens includes sequentially from an object side, a first lens group having a positive refractive power; a second lens group having a negative refractive power; and a third lens group having a negative refractive power. The second lens group is moved along the optical axis, whereby focusing from a focus state for an object at infinity to a focus state for a minimum object distance is performed. The inner focus lens satisfies a conditional expression (1) $-29.0 \leq f3/f \leq -5.4$, where f3 is a focal length of the third lens group at the focus state for an object at infinity and f is a focal length of the optical system overall at the focus state for an object at infinity.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a diagram of various types of aberration occurring in the inner focus lens according to the first embodiment;

FIG. 4 is a diagram of various types of aberration occurring in the inner focus lens according to the second embodiment;

FIG. 6 is a diagram of various types of aberration occurring in the inner focus lens according to the third embodiment.

DETAILED DESCRIPTION OF THE PREFERRED EMBODIMENTS

Figure 1:
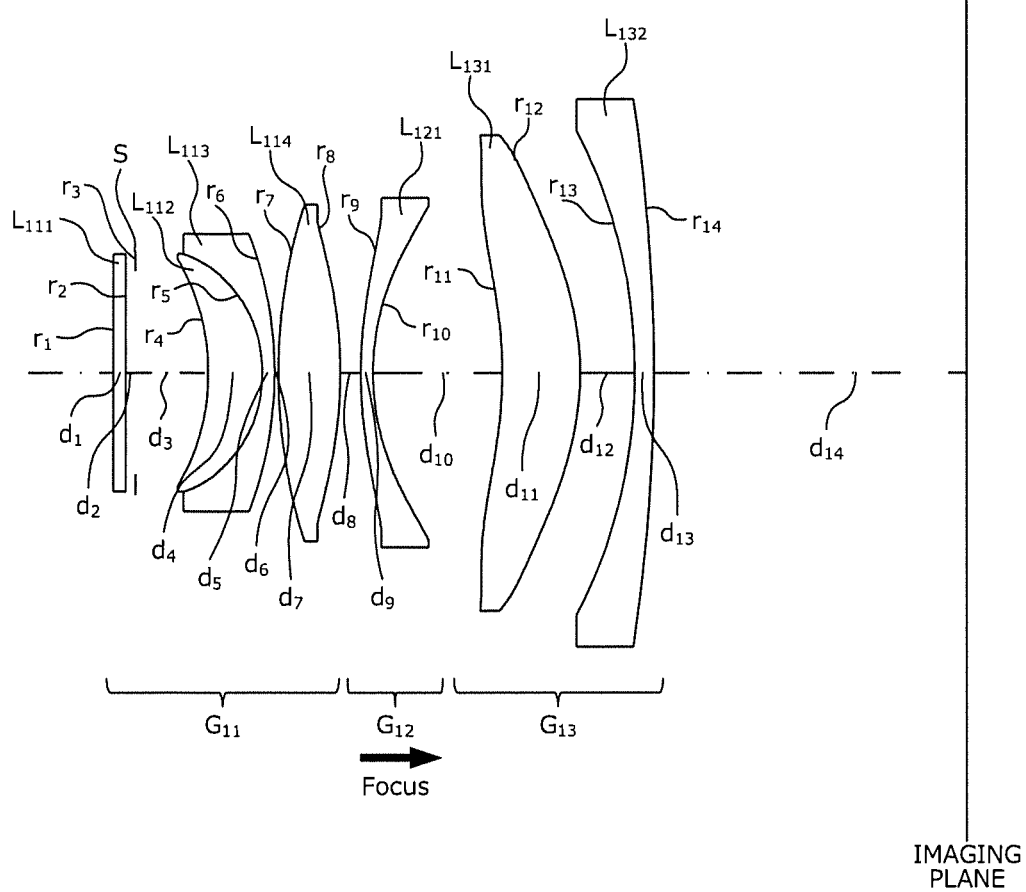
FIG. 1 is a diagram depicting, along the optical axis, a configuration of an inner focus lens according to a first embodiment.

Preferred embodiments of an inner focus lens according to the present invention will be described in detail.

The inner focus lens according to the present invention is configured by a first lens group having a positive refractive power, a second lens group having a negative refractive power, and a third lens group having a negative refractive power, sequentially arranged from an object side.

In the inner focus lens according to the present invention, the second lens group is moved along the optical axis whereby focusing from a focus state for an object at infinity to a focus state for the minimum object distance is performed. In this manner, by moving the second lens group to perform focusing, protection against dust and sound-proofing performance are enhanced without changes in the overall length of the optical system.

Further, by disposing farthest on the object side, the first lens group having a positive refractive power, the diameter of the luminous flux guided to the subsequent second lens group can be reduced. Therefore, the diameter of the second lens group, which is the focusing group, is reduced, enabling a reduction in the weight of second lens group to be facilitated. As a result, high-speed, silent focusing becomes possible, which is effective for video filming. Further, since the diameter of the second lens group can be reduced, this is advantageous for reducing the diameter of the optical system.

Moreover, by disposing farthest on the image side, the third lens group having a negative refractive power, telecentricity can be increased and back focus can be reduced, enabling size reductions of optical system to be facilitated.

One object of the present invention is to provide an inner focus lens that is also optimal for a compact camera capable of video filming, i.e., a high imaging performance inner focus lens for which reduction of the overall length and diameter is achieved. Another object is to provide a high imaging performance inner focus lens having focal lengths that accommodate wide angles to standard angles of view. Thus, to achieve such objects, in addition to the characteristics above, various conditions are set such as those indicated below.

In the inner focus lens according to the present invention, the following conditional expression is preferably satisfied; where, f3 is the focal length of the third lens group at a focus state for an object at infinity; and f is the focal length of the optical system overall at a focus state for an object at infinity.

$$-29.0 \leq f3/f \leq -5.4 \qquad (1)$$

Conditional expression (1) prescribes a ratio of the focal lengths of the third lens group and of the optical system, at a focus state for an object at infinity. Satisfaction of conditional expression (1) enables reductions in the overall length and diameter of the optical system as well as enables the refractive power of the third lens group to be proper and without deterioration of imaging performance.

Below the lower limit of conditional expression (1), the refractive power of the third lens group becomes weak, whereby the back focus increases, making reductions in the size of the optical system difficult. On the other hand, above the upper limit of conditional expression (1), the refractive power of the third lens group becomes strong. In this case, the F number in the optical system overall tends to increase, making a bright optical system impossible to obtain. To realize a bright optical system in this state, the aperture stop has to be opened greatly. Nonetheless, if the aperture stop is opened greatly, the occurrence of various types of aberration becomes conspicuous and therefore, to realize an optical system having favorable imaging performance, the number of lenses for correcting aberration has to be increased. In particular, the number of lenses forming the first lens group has to be increased. If the number of lenses forming the optical system is high, reductions in the size and weight of the optical system become difficult and therefore, are not desirable.

By satisfying conditional expression (1) within the following range, a more favorable effect can be expected.

$$-26.0 \leq f3/f \leq -5.4 \qquad (1a)$$

By satisfying the range prescribed by conditional expression (1a), an inner focus lens that is compact and has better imaging performance can be realized.

By further satisfying conditional expression (1a) within the following range, an even more compact, higher performance inner focus lens can be realized.

$$-24.0 \leq f3/f \leq -5.4 \qquad (1b)$$

In the inner focus lens according to the present invention, the following conditional expression is preferably satisfied; where, f1 is the focal length of the first lens group at a focus state for an object at infinity; and f is the focal length of the optical system overall at a focus state for an object at infinity.

$$0.18 \leq f1/f5 \leq 0.99 \qquad (2)$$

Conditional expression (2) prescribes a ratio of the focal lengths of the first lens group and of the optical system overall, at a focus state for an object at infinity. Satisfaction of conditional expression (2) enables a bright inner focus lens to be realized that has high imaging performance at wide angles and for which the refractive power of the first lens group is proper and reductions of the front lens diameter and overall length of the optical system are facilitated.

Below the lower limit of conditional expression (2), the focal length of the first lens group becomes short, positive spherical aberration becomes excessive, paraxial magnification of the subsequent lens group becomes large, and the rear lens diameter increases, which are related to increases in the size of the optical system and therefore, are not desirable. On the other hand, above the upper limit of conditional expression (2), the focal length of first lens group becomes long, increasing the overall length of the optical system and making size reductions of the optical system difficult.

By satisfying conditional expression (2) within the following range, a more favorable effect can be expected.

$$0.22 \leq f1/f \leq 0.90 \qquad (2a)$$

By satisfying the range prescribed by conditional expression (2a), an inner focus lens that is compact and has better imaging performance at wide angles can be realized.

By further satisfying conditional expression (2a) within the following range, a compact inner focus lens with higher performance at wide angles can be realized.

$$0.30 \leq f1/f \leq 0.80 \qquad (2b)$$

In the inner focus lens according to the present invention, the following conditional expression is preferably satisfied; where, βinf is the paraxial magnification of the second lens group at a focus state for an object at infinity; and β mod is the paraxial magnification of the second lens group at a focus state for the minimum object distance.

$$0.51 \leq \beta inf/\beta \, mod \leq 2.07 \qquad (3)$$

Conditional expression (3) prescribes a ratio of the paraxial transverse magnification of the second lens group at a focus state for an object at infinity and at a focus state for the minimum object distance. Satisfaction of conditional expression (3) enables changes in magnification to be suppressed even when the focusing group (second lens group)

is moved and enables angle of view variations to be suppressed during focusing. If the range prescribed by conditional expression (3) is deviated from, angle of view variations cannot be suppressed during focusing. If angle of view variation occurs while the focusing group is moving, the image looks blurred and the image quality drops.

By satisfying conditional expression (3) within the following range, a more favorable effect can be expected.

$$0.60 \leq \beta inf/\beta \bmod \leq 1.80 \quad (3a)$$

By satisfying the range prescribed by conditional expression (3a), angle of view variations during focusing can be suppressed further.

By further satisfying conditional expression (3a) within the following range, angle of view variations during focusing can be suppressed even further.

$$0.68 \leq \beta inf/\beta \bmod \leq 1.60 \quad (3b)$$

By further satisfying conditional expression (3b) within the following range, angle of view variations during focusing can be made extremely small.

$$0.80 \leq \beta inf/\beta \bmod \leq 1.40 \quad (3c)$$

In the inner focus lens according to the present invention, the third lens group includes sequentially from the object side, a front sub-lens group having a positive refractive power and a rear sub-lens group having a negative refractive power; and an axial air gap that is the widest in the third lens group is formed between the front sub-lens group and the rear sub-lens group.

By such a configuration, the lens diameter near the imaging plane is reduced and imaging performance can be improved. In other words, increased lens diameter on the image side (an issue in reducing the size of optical systems having a short flange focal length and for mounting on compact cameras such as mirrorless interchangeable-lens cameras) can be suppressed by disposing the front sub-lens group having a positive refractive power, on the object side of the third lens group. Further, by disposing the rear sub-lens group having a negative refractive power on the image side of the front sub-lens group to form an air gap, axial aberration can be corrected by the front sub-lens group having a positive refractive power; and at the rear sub-lens group, off axis aberration, in particular, distortion, can be favorably corrected.

In the inner focus lens according to the present invention, a simple lens element having a negative refractive power is preferably disposed farthest on the image side of the third lens group. With such a configuration, the diameter of the third lens group (the lens farthest on the image side) can be further reduced, which is optimal for compact cameras such as mirrorless interchangeable-lens cameras that have come into wide-spread use in recent years.

A simple lens element includes a single ground lens, an aspheric lens, a compound aspheric lens, and a cemented lens, where the elements are not bonded to one another to have a layer of air therebetween and for example, a simple lens element does not include two lenses (a positive lens and a negative lens), etc.

In the inner focus lens according to the present invention, the following conditional expression is preferably satisfied, where in addition to disposing farthest on the image side of the third lens group, a simple lens element having a negative refractive power, R1 is the radius of curvature of the surface at the air interface on the object side of the simple lens element having a negative refractive power; and R2 is the radius of curvature of the surface at the air interface on the image side of the simple lens element having a negative refractive power.

$$(R1+R2)/(R1-R2) \leq 0.0 \quad (4)$$

Conditional expression (4) prescribes the shape of the simple lens element having a negative refractive power and disposed farthest on the image side of the third lens group. By satisfying conditional expression (4), the radius of curvature of the surface on the object side of the simple lens element becomes smaller than the radius of curvature of the surface on the image side. As a result, favorable correction of off axis coma becomes possible.

By satisfying conditional expression (4) within the following range, a more favorable effect can be expected.

$$(R1+R2)/(R1-R2) \leq -1.0 \quad (4a)$$

By satisfying the range prescribed by conditional expression (4a), favorable correction of off axis coma becomes possible.

By satisfying conditional expression (4a) within the following range, more effective correction of off axis coma is achieved.

$$-100.00 \leq (R1+R2)/(R1-R2) \leq -1.02 \quad (4b)$$

In the inner focus lens according to the present invention, the following conditional expression is preferably satisfied; where, L1s is the axial distance from the surface farthest on the object side of the first lens group to the aperture stop; L is the overall length of the optical system (air-conversion optical path length from the apex of the lens surface farthest on the object side to the imaging plane).

$$0.01 \leq L1s/L \leq 0.53 \quad (5)$$

Conditional expression (5) prescribes a ratio of the axial distance from the surface farthest on the object side of the first lens group to the aperture stop and the overall length of the optical system. By satisfying conditional expression (5), an optimal position of the aperture stop is determined with respect to the overall length of the optical system, enabling reduction of the optical system diameter while maintaining high imaging performance.

Below the lower limit of conditional expression (5), the aperture stop is too close to the object side, the lens diameter on the image side increases, and at the rear group, the occurrence of off axis aberration, primarily distortion, becomes conspicuous and therefore, is not desirable. On the other hand, above the upper limit of conditional expression (5), the aperture stop is to too close to the image side and with the increase in the effective diameter of the front lens, size reductions of the optical system become difficult.

By satisfying conditional expression (5) within the following range, a more favorable effect can be expected.

$$0.012 \leq L1s/L \leq 0.500 \quad (5a)$$

By satisfying the range prescribed by conditional expression (5a), further reduction in the optical system diameter can be realized while maintaining high imaging performance.

By satisfying conditional expression (5a) within the following range, even further reduction of the optical system diameter can be realized.

$$0.013 \leq L1s/L \leq 0.400 \quad (5b)$$

By satisfying conditional expression (5b) within the following range, yet further reduction of the optical system diameter can be realized.

$$0.013 \leq L1s/L \leq 0.300 \quad (5c)$$

In the inner focus lens according to the present invention, the second lens group is preferably configured by a simple lens element having a negative refractive power.

By forming the second lens group by a simple lens element having a negative refractive power, reductions in the size and weight of the focusing group are achieved, enabling high-speed focusing, which is beneficial for video filming. Reductions in the size and weight of the focusing group decrease the load on the driving mechanism such as an actuator for driving the focusing group, contributing to reduced power consumption. The capacity of the driving mechanism can be further reduced.

In the inner focus lens according to the present invention, the following conditional expression is preferably satisfied; where, f2 is the focal length of the second lens group at a focus state for an object at infinity; and f is the focal length of the optical system at a focus state for an object at infinity.

$$-2.12 \leq f2/f \leq -0.18 \tag{6}$$

Conditional expression (6) prescribes a ratio of the focal lengths of the second lens group and of the optical system overall, at a focus state for an object at infinity. By satisfying conditional expression (6), size reductions of the optical system can be realized while maintaining high imaging performance (particularly beneficial for field curvature correction).

Below, the lower limit of conditional expression (6), the focal length of the second lens group becomes too long and the negative power of the second lens group becomes too weak. As a result, the distance that the second lens group has to move during focusing increases, increasing the overall length of the optical system and making size reductions of the optical system difficult. On the other hand, above the upper limit of conditional expression (6), the focal length of the second lens group becomes too short and the negative power of the second lens group becomes too strong. As a result, aberration variations (particularly field curvature variations) accompanying the movement of the second lens group during focusing and variation of the angle of view become excessive and are not desirable.

By satisfying conditional expression (6) within the following range, a more favorable effect can be expected.

$$-1.90 \leq f2/f \leq -0.19 \tag{6a}$$

By satisfying the range prescribed by conditional expression (6a), a smaller inner focus lens having excellent imaging performance can be realized.

By satisfying conditional expression (6a) within the following range, a smaller, high-performance inner focus lens can be realized.

$$-1.50 \leq f2/f \leq -0.20 \tag{6b}$$

In the inner focus lens according to the present invention, a lens (stabilizing group) that is configured by a lens other than the lens farthest on the object side is moved in an orthogonal direction with respect to the optical axis to shift the image and perform stabilization correction. The inner focus lens preferably satisfies the following conditional expression; where, $\beta p$ is the transverse magnification of the lens group moved in a direction orthogonal to the optical axis; and $\beta r$ is the composite transverse magnification of the lenses disposed farther on the image side than the lens group that is moved in a direction orthogonal to the optical axis.

$$0.15 \leq (1-\beta p) \times \beta r \leq 4.50 \tag{7}$$

Conditional expression (7) prescribes a shift ratio of the image, for the moving distance of the lens group that is moved during stabilization correction. By satisfying conditional expression (7), the distance that the stabilizing group is moved during stabilization correction is suppressed, enabling reduction of the optical system diameter and improved stabilization correction performance. If the lens that is disposed farthest on the image side is included in the stabilizing group, the value of $\beta r$ in conditional expression (7) is 1.

Below the lower limit of conditional expression (7), the distance that the stabilizing group has to be moved in an orthogonal direction to shift the image by a given amount increases, the optical system diameter becomes large, and size reductions of the optical system are inhibited. On the other hand, above the upper limit of conditional expression (7), even if the stabilizing group is moved minimally, the image shifts greatly and consequently, the stabilization correction performance drops. In this state, if high stabilization correction performance is to be maintained, extremely high precision is required in controlling the stabilizing group during stabilization correction. As a result, the structure of the driving apparatus of the stabilizing group becomes complicated, which bounces back on the manufacturing cost of the lens unit and therefore, is not desirable.

Irrespective of whether the stabilizing group is configured by multiple lenses or a single lens, the effects of stabilization correction do not change. When the stabilizing group is configured by a single lens, the size and weight of the stabilizing group can be reduced, which is beneficial in reducing the overall size and weight of the optical system. By reducing the size and weight of the stabilizing group, the load on the driving mechanism for driving the stabilizing group also decreases, contributing to reduced power consumption. Further, by employing for the stabilizing group, an aspheric lens (a shape that weakens the power of paraxial curvature), variation of single-sided blurring and central coma during stabilization correction can be suppressed.

By satisfying conditional expression (7) within the following range, a more favorable effect can be expected.

$$0.16 \leq (1-\beta p) \times \beta r \leq 4.30 \tag{7a}$$

By satisfying the range prescribed by conditional expression (7a), a compact inner focus lens having better stabilization correction performance can be realized.

By satisfying conditional expression (7a) within the following range, a compact inner focus lens having extremely favorable stabilization correction performance can be realized.

$$0.16 \leq (1-\beta p) \times \beta r \leq 4.00 \tag{7b}$$

In the inner focus lens according to the present invention, the simple lens element having a negative refractive power that is disposed farthest on the image side of the third lens group is preferably configured by a simple glass material. By forming the simple lens element in the third lens group by a simple glass material, i.e., a simple lens, size reductions along the direction of the optical axis and along the direction of the diameter of the simple lens element become easy. Reduction in the weight of the simple lens element also becomes possible.

In the inner focus lens according to the present invention, the following conditional expression is preferably satisfied; where, $\nu en$ is the Abbe number for e-line of the simple lens element having a negative refractive power and disposed farthest on the image side of the third lens group.

$$30 \leq \nu en \tag{8}$$

Below the lower limit of conditional expression (8), chromatic difference of magnification becomes over corrected, making high imaging performance difficult to maintain and therefore, is not desirable.

In the inner focus lens according to the present invention, the following conditional expression is preferably satisfied; where, R21 is the radius of curvature of the surface farthest on the image side of the second lens group and R22 is the radius of curvature of the surface farthest on the image side of the second lens group.

$$0 \leq (R21+R22)/(R21-R22) \quad (9)$$

Conditional expression (9) prescribes the shapes of the surfaces farthest on the object side and on the image side of the second lens group. By satisfying conditional expression (9), in the second lens group, the radius of curvature of the surface farthest on the image side becomes smaller than the radius of curvature of the surface farthest on the object side. As a result, variation of the angle of the light rays incident on the surface having a strong power becomes small, enabling variation of the field curvature during focusing to be suppressed.

By satisfying conditional expression (9) within the following range, more favorable results can be expected.

$$1 \leq (R21+R22)/(R21-R22) \quad (9a)$$

By satisfying the range prescribed by conditional expression (9a), variation of the field curvature during focusing can be further suppressed.

By satisfying conditional expression (9a) within the following range, variation of the field curvature can be made extremely small.

$$1 \leq (R21+R22)/(R21-R22) \leq 300 \quad (9b)$$

In the inner focus lens according to the present invention, disposal a positive aspheric lens in the first lens group is beneficial in correcting spherical aberration. In particular, by forming on the positive lens, an aspheric surface, which weakens the power of paraxial curvature, the effectiveness of spherical aberration correction is improved.

In the inner focus lens according to the present invention, by forming an aspheric surface on a lens forming the second lens group, correction of field curvature becomes more effective. In particular, by forming on a lens forming the second lens group, an aspheric surface, which weakens the power of paraxial curvature, correction of field curvature is further improved and the effect of suppressing field curvature variation during focusing becomes higher.

In the inner focus lens according to the present invention, forming an aspheric surface on a lens of the third lens group is beneficial in correcting field curvature. In particular, by forming on a lens of the third lens group, an aspheric surface, which weakens the power of paraxial curvature, the corrective effect on field curvature is improved.

The lens disposed on the image side separated by air from the second lens group is preferably a simple lens element having a positive refractive power. Disposal of the simple lens element on the image side of the second lens group enables magnification of the second lens group to be increased and the distance that the second lens group is moved during focusing to be decreased. As a result, reductions in the size of the optical system and high-speed focusing become possible.

As described, according to the present invention, reductions in the overall length and diameter are achieved and an inner focus lens having high imaging performance can be provided. Furthermore, an inner focus lens that has focal lengths accommodating wide angles to standard angles of view and high imaging performance can be provided. Moreover, a compact inner focus lens having favorable stabilization correction performance can be provided. Thus, according to the present invention, an inner focus lens that can be mounted easily on a compact camera capable of video filming can be provided. In particular, by satisfying the conditional expressions above, an inner focus lens that is optimal for video filming and has high imaging performance with a smaller size can be realized.

Embodiments of the inner focus lens according to the present invention will be described in detail with reference to the accompanying drawings. The invention is not limited by the embodiments below.

FIG. 1 is a diagram depicting, along the optical axis, a configuration of the inner focus lens according to a first embodiment. FIG. 1 depicts a focus state for an object at infinity. The inner focus lens includes sequentially from an object side nearest a non-depicted object, a first lens group $G_{11}$ having a positive refractive power, a second lens group $G_{12}$ having a negative refractive power, and a third lens group $G_{13}$ having a negative refractive power.

The first lens group $G_{11}$ includes sequentially from the object side, a lens $L_{111}$ having no refractive power, an aperture stop S determining a given diameter, a positive lens $L_{112}$, a negative lens $L_{113}$, and a positive lens $L_{114}$. The positive lens $L_{112}$ and the negative lens $L_{113}$ are cemented. Both surfaces of the positive lens $L_{114}$ are aspheric.

The second lens group $G_{12}$ is configured by a negative lens $L_{121}$. Both surfaces of the negative lens $L_{121}$ are aspheric. The second lens group $G_{12}$ is moved along the optical axis from the object side to the image side, whereby focusing from a focus state for an object at infinity to a focus state for the minimum object distance is performed.

The third lens group $G_{13}$ includes sequentially from the object side, a positive lens $L_{131}$ (front sub-lens group) and a negative lens $L_{132}$ (rear sub-lens group). Both surfaces of the positive lens $L_{131}$ are aspheric. An air gap is formed between the positive lens $L_{131}$ and the negative lens $L_{132}$.

In the inner focus lens according to the first embodiment, the positive lens $L_{114}$ included in the first lens group $G_{11}$ or the positive lens $L_{131}$ included in the third lens group $G_{13}$ is moved in a direction orthogonal to the optical axis, whereby stabilization correction is performed. Further, stabilization correction can be performed by collectively moving all of the lenses of the first lens group $G_{11}$ excluding the lens $L_{111}$ having no refractive power in a direction orthogonal to the optical axis.

Here, various values related to the inner focus lens according to the first embodiment are given.

(Lens Data)

| | | | |
|---|---|---|---|
| $r_1 = \infty$ | $d_1 = 0.6500$ | $ne_1 = 1.51872$ | $ve_1 = 64.00$ |
| $r_2 = \infty$ | $d_2 = 0.5000$ | | |
| $r_3 = \infty$ (aperture stop) | $d_3 = 3.8293$ | | |
| $r_4 = -9.4944$ | $d_4 = 2.8640$ | $ne_2 = 1.83945$ | $ve_2 = 42.47$ |
| $r_5 = -5.8201$ | $d_5 = 0.6500$ | $ne_3 = 1.81184$ | $ve_3 = 33.03$ |
| $r_6 = -16.1384$ | $d_6 = 0.2000$ | | |
| $r_7 = 22.3959$ (aspheric surface) | $d_7 = 3.2615$ | $ne_4 = 1.85639$ | $ve_4 = 39.85$ |
| $r_8 = -18.3976$ (aspheric surface) | $d_8 = D(8)$ (variable) | | |
| $r_9 = 19.3324$ (aspheric surface) | $d_9 = 0.6500$ | $ne_5 = 1.82917$ | $ve_5 = 23.86$ |
| $r_{10} = 10.5762$ (aspheric surface) | $d_{10} = D(10)$ (variable) | | |
| $r_{11} = -17.1418$ (aspheric surface) | $d_{11} = 4.1419$ | $ne_6 = 1.74689$ | $ve_6 = 49.07$ |
| $r_{12} = -12.0908$ (aspheric surface) | $d_{12} = 2.8770$ | | |

-continued

| | | | |
|---|---|---|---|
| $r_{13} = -22.5833$ | $d_{13} = 1.0000$ | $ne_7 = 1.83930$ | $\nu e_7 = 37.09$ |
| $r_{14} = -77.3086$ | $d_{14} = Bf$ | | |

Constant of the Cone (k) and Aspheric Coefficients ($A_4$, $A_6$, $A_8$, $A_{10}$)

(Seventh Order)

$k = 0$,
$A_4 = -4.44632 \times 10^{-5}$, $A_6 = -3.60976 \times 10^{-8}$,
$A_8 = 9.18001 \times 10^{-9}$, $A_{10} = -2.80183 \times 10^{-11}$
(Eighth Order)

$k = 0$,
$A_4 = 5.44540 \times 10^{-5}$, $A_6 = 2.72131 \times 10^{-7}$,
$A_8 = 3.22891 \times 10^{-9}$, $A_{10} = 9.43255 \times 10^{-12}$
(Ninth Order)

$k = 0$,
$A_4 = -2.70854 \times 10^{-5}$, $A_6 = -2.61994 \times 10^{-6}$,
$A_8 = 2.06465 \times 10^{-8}$, $A_{10} = -1.04244 \times 10^{-10}$
(Tenth Order)

$k = 0$,
$A_4 = 3.25644 \times 10^{-5}$, $A_6 = -3.06186 \times 10^{-6}$,
$A_8 = -3.22202 \times 10^{-9}$, $A_{10} = 7.42390 \times 10^{-11}$
(Eleventh Order)

$k = 0$,
$A_4 = 1.76311 \times 10^{-4}$, $A_6 = 1.34885 \times 10^{-6}$,
$A_8 = -1.04265 \times 10^{-8}$, $A_{10} = 3.35661 \times 10^{-12}$
(Twelfth Order)

$k = 0$,
$A_4 = 1.19215 \times 10^{-4}$, $A_6 = 5.79903 \times 10^{-7}$,
$A_8 = 2.49765 \times 10^{-9}$, $A_{10} = -1.46183 \times 10^{-11}$ (Focal State Data)

| | Infinity | Minimum Object Distance (object distance) |
|---|---|---|
| D(8) | 1.0688 | 1.8929 |
| D(10) | 6.8075 | 5.9834 |
| f (focal length of optical system overall) | 27.5462 | 26.0246 |
| F no. (F number) | 2.8840 | 2.8985 |
| ω (half angle of view) | 38.5881 | 38.3233 |
| Y (image height) | 20.29 | 21.07 |
| Bf (back focus) | 15.6482 | 15.6482 |

(Values Related to Conditional Expression (1))

f3 (focal length of third lens group $G_{13}$ at focus state for object at infinity) = −400.0000
f3/f = −14.52
(Values Related to Conditional Expression (2))

f1 (focal length of first lens group $G_{11}$ at focus state for object at infinity) = 13.6190
f1/f = 0.49
(Values Related to Conditional Expression (3))

βinf (paraxial magnification of second lens group $G_{12}$ at focus state for object at infinity) = 1.87
βmod (paraxial magnification of second lens group $G_{12}$ at focus state for minimum object distance) = 1.85
βinf/βmod = 1.01
(Values Related to Conditional Expression (4))

R1 (radius of curvature of surface at air interface on object side of negative lens $L_{132}$) = −22.5833
R2 (radius of curvature of surface at air interface on image side of negative lens $L_{132}$) = −77.3086
(R1 + R2)/(R1 − R2) = −1.83
(Values Related to Conditional Expression (5))

L1s (axial distance from surface farthest on object side of first lens group $G_{11}$ to aperture stop S) = 1.1500

L (overall length of optical system) = 44.1482
L1s/L = 0.03
(Values Related to Conditional Expression (6))

f2 (focal length of second lens group $G_{12}$ at focus state for object at infinity) = −29.1423
f2/f = −1.06
(Values Related to Conditional Expression (7))
When moved lens group (stabilizing group) is positive lens $L_{114}$ of first lens group $G_{11}$ βp (transverse magnification of lens group moved in direction orthogonal to optical axis) = −0.33
βr (composite transverse magnification of lenses disposed farther on image side than lens group moved in direction orthogonal to optical axis) = 2.02
(1 − βp) × βr = 2.69
When moved lens group (stabilizing group) is positive lens $L_{131}$ of third lens group $G_{13}$ βp (transverse magnification of lens group moved in direction orthogonal to optical axis) = 0.76
βr (composite transverse magnification of lenses disposed farther on image side than lens group moved in direction orthogonal to optical axis) = 1.43
(1 − βp) × βr = 0.35
When moved lens group (stabilizing group) is all lenses of first lens group $G_{11}$, excluding lens $L_{111}$ having no refractive power βp (transverse magnification of lens group moved in direction orthogonal to optical axis) = 0
βr (composite transverse magnification of lenses disposed farther on image side than lens group moved in direction orthogonal to optical axis) = 1
(1 − βp) × βr = 1
(Values Related to Conditional Expression (8))

$\nu en$ (Abbe number for e-line of negative lens $L_{132}$) = 37.09
(Values Related to Conditional Expression (9))

R21 (radius of curvature of surface farthest on object side of negative lens $L_{121}$) = 19.3324
R22 (radius of curvature of surface farthest on image side of negative lens $L_{121}$) = 10.5762
(R21 + R22)/(R21 − R22) = 3.42

FIG. 2 is a diagram of various types of aberration occurring in the inner focus lens according to the first embodiment. In the diagram, curves depict wavelength aberration corresponding to the e-line (λ=546.074 nm). S and M shown with respect to astigmatism, respectively indicate aberration at the sagittal imaging plane and at the meridonal imaging plane.

Figure 3:
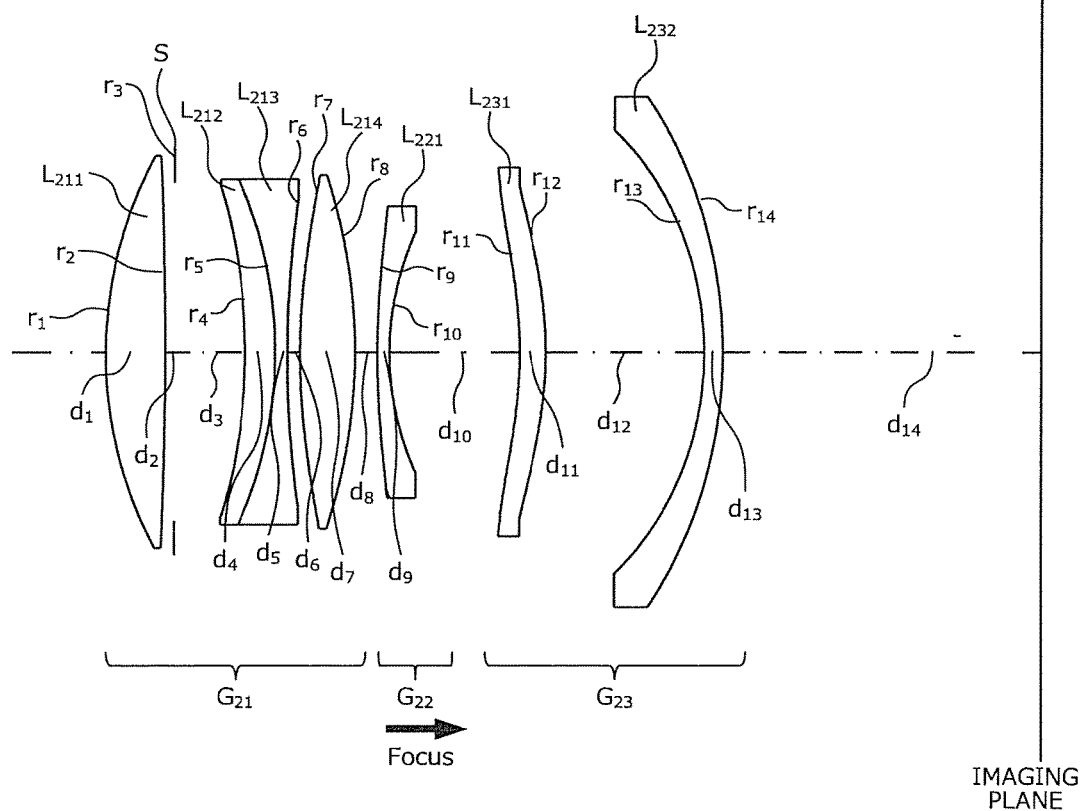
FIG. 3 is a diagram depicting, along the optical axis, a configuration of the inner focus lens according to a second embodiment.

FIG. 3 is a diagram depicting, along the optical axis, a configuration of the inner focus lens according to a second embodiment. FIG. 3 depicts a focus state for an object at infinity. The inner focus lens includes sequentially from the object side, a first lens group $G_{21}$ having a positive refractive power, a second lens group $G_{22}$ having a negative refractive power, and a third lens group $G_{23}$ having a negative refractive power.

The first lens group $G_{21}$ includes sequentially from the object side, a positive lens $L_{211}$, the aperture stop S determining a given diameter, a positive lens $L_{212}$, a negative lens $L_{213}$, and a positive lens $L_{214}$. The positive lens $L_{212}$ and the negative lens $L_{213}$ are cemented. Both surfaces of the positive lens $L_{214}$ are aspheric.

The second lens group $G_{22}$ is configured by a negative lens $L_{221}$. Both surfaces of the negative lens $L_{221}$ are aspheric. The second lens group $G_{22}$ is moved along the optical axis from the object side to the image side, whereby focusing from a focus state for an object at infinity to a focus state for the minimum object distance is performed.

The third lens group $G_{23}$ includes sequentially from the object side, a positive lens $L_{231}$ (front sub-lens group) and a negative lens $L_{232}$ (rear sub-lens group). Both surfaces of the positive lens $L_{231}$ are aspheric. An air gap is formed between the positive lens $L_{231}$ and the negative lens $L_{232}$.

In the inner focus lens according to the second embodiment, the positive lens $L_{214}$ included in the first lens group $G_{21}$ or the positive lens $L_{231}$ included in the third lens group $G_{23}$ is moved in a direction orthogonal to the optical axis, whereby stabilization correction is performed.

Here, various values related to the inner focus lens according to the second embodiment are given.

(Lens Data)

| | | | |
|---|---|---|---|
| $r_1 = 17.9780$ | $d_1 = 3.1723$ | $ne_1 = 1.49845$ | $\nu e_1 = 81.21$ |
| $r_2 = -179.8468$ | $d_2 = 0.5000$ | | |
| $r_3 = \infty$ (aperture stop) | $d_3 = 3.7714$ | | |
| $r_4 = -24.8117$ | $d_4 = 1.6114$ | $ne_2 = 1.49845$ | $\nu e_2 = 81.21$ |
| $r_5 = -17.9439$ | $d_5 = 0.6500$ | $ne_3 = 1.73432$ | $\nu e_3 = 28.10$ |
| $r_6 = 47.4504$ | $d_6 = 0.6736$ | | |
| $r_7 = 28.5683$ (aspheric surface) | $d_7 = 2.9298$ | $ne_4 = 1.88765$ | $\nu e_4 = 36.97$ |
| $r_8 = -23.6412$ (aspheric surface) | $d_8 = D(8)$ (variable) | | |
| $r_9 = 38.5730$ (aspheric surface) | $d_9 = 0.6500$ | $ne_5 = 1.62518$ | $\nu e_5 = 57.96$ |
| $r_{10} = 12.3652$ (aspheric surface) | $d_{10} = D(10)$ (variable) | | |
| $r_{11} = -19.3415$ (aspheric surface) | $d_{11} = 1.4124$ | $ne_6 = 2.00912$ | $\nu e_6 = 28.91$ |
| $r_{12} = -17.3396$ (aspheric surface) | $d_{12} = 8.4378$ | | |
| $r_{13} = -13.9954$ | $d_{13} = 1.0000$ | $ne_7 = 1.58481$ | $\nu e_7 = 40.61$ |
| $r_{14} = -20.2884$ | $d_{14} = Bf$ | | |

Constant of the Cone (k) and Aspheric Coefficients ($A_4, A_6, A_8, A_{10}$)

(Seventh Order)

$k = 0$,
$A_4 = -5.31140 \times 10^{-5}$, $A_6 = 1.77167 \times 10^{-8}$,
$A_8 = -2.98858 \times 10^{-10}$, $A_{10} = 2.27493 \times 10^{-11}$ (Eighth Order)

$k = 0$,
$A_4 = 3.94940 \times 10^{-6}$, $A_6 = -5.26041 \times 10^{-8}$,
$A_8 = -8.87342 \times 10^{-11}$, $A_{10} = 1.87394 \times 10^{-11}$ (Ninth Order)

$k = 0$,
$A_4 = 7.42096 \times 10^{-6}$, $A_6 = -1.53328 \times 10^{-6}$,
$A_8 = 1.49734 \times 10^{-8}$, $A_{10} = -4.71441 \times 10^{-11}$ (Tenth Order)

$k = 0$,
$A_4 = 1.80928 \times 10^{-5}$, $A_6 = -1.60282 \times 10^{-6}$,
$A_8 = 6.53719 \times 10^{-9}$, $A_{10} = 3.47436 \times 10^{-12}$ (Eleventh Order)

$k = 0$,
$A_4 = 1.40765 \times 10^{-4}$, $A_6 = 4.99455 \times 10^{-7}$,
$A_8 = -1.94373 \times 10^{-9}$, $A_{10} = -9.37987 \times 10^{-12}$ (Twelfth Order)

$k = 0$,
$A_4 = 1.04350 \times 10^{-4}$, $A_6 = 3.22665 \times 10^{-7}$,
$A_8 = 6.06200 \times 10^{-10}$, $A_{10} = -1.72843 \times 10^{-11}$ (Focal State Data)

| | Infinity | Minimum Object Distance (object distance) |
|---|---|---|
| D(8) | 1.2021 | 3.4333 |
| D(10) | 6.9558 | 4.7246 |
| f (focal length of optical system overall) | 48.4962 | 40.8401 |

-continued

| | | |
|---|---|---|
| F no. (F number) | 2.8840 | 2.9589 |
| ω (half angle of view) | 21.9113 | 20.7990 |
| Y (image height) | 21.63 | 21.63 |
| Bf (back focus) | 16.1817 | 16.1817 |

(Values Related to Conditional Expression (1))

f3 (focal length of third lens group $G_{23}$ at focus state for object at infinity) = −263.2280
f3/f = −5.43
(Values Related to Conditional Expression (2))

f1 (focal length of first lens group $G_{21}$ at focus state for object at infinity) = 22.0829
f1/f = 0.46
(Values Related to Conditional Expression (3))

βinf (paraxial magnification of second lens group $G_{22}$ at focus state for object at infinity) = 2.09
βmod (paraxial magnification of second lens group $G_{22}$ at focus state for minimum object distance) = 2.02
βinf/βmod = 1.04
(Values Related to Conditional Expression (4))

R1 (radius of curvature of surface at air interface on object side of negative lens $L_{232}$) = −13.9954
R2 (radius of curvature of surface at air interface on image side of negative lens $L_{232}$) = −20.2884
(R1 + R2)/(R1 − R2) = −5.45
(Values Related to Conditional Expression (5))

L1s (axial distance from surface farthest on object side of first lens group $G_{21}$ to aperture stop S) = 3.6723
L (overall length of optical system) = 49.1482
L1s/L = 0.07
(Values Related to Conditional Expression (6))

f2 (focal length of second lens group $G_{22}$ at focus state for object at infinity) = −29.3910
f2/f = −0.61
(Values Related to Conditional Expression (7))
When moved lens group (stabilizing group) is positive lens $L_{214}$ of first lens group $G_{21}$ βp (transverse magnification of lens group moved in direction orthogonal to optical axis) = −0.19
βr (composite transverse magnification of lenses disposed farther on image side than lens group moved in direction orthogonal to optical axis) = 2.20
(1 − βp) × βr = 2.62
When moved lens group (stabilizing group) is positive lens $L_{231}$ of third lens group $G_{23}$ βp (transverse magnification of lens group moved in direction orthogonal to optical axis) = 0.86
βr (composite transverse magnification of lenses disposed farther on image side than lens group moved in direction orthogonal to optical axis) = 1.22
(1 − βp) × βr = 0.17
(Values Related to Conditional Expression (8))

$\nu$en (Abbe number for e-line of negative lens $L_{232}$) = 40.61
(Values Related to Conditional Expression (9))

R21 (radius of curvature of surface farthest on object side of negative lens $L_{221}$) = 38.5730
R22 (radius of curvature of surface farthest on image side of negative lens $L_{221}$) = 12.3652
(R21 + R22)/(R21 − R22) = 1.94

FIG. 4 is a diagram of various types of aberration occurring in the inner focus lens according to the second embodiment. In the diagram, curves depict wavelength aberration corresponding to the e-line (λ=546.074 nm). S and M shown with respect to astigmatism, respectively indicate aberration at the sagittal imaging plane and at the meridonal imaging plane.

Figure 5:
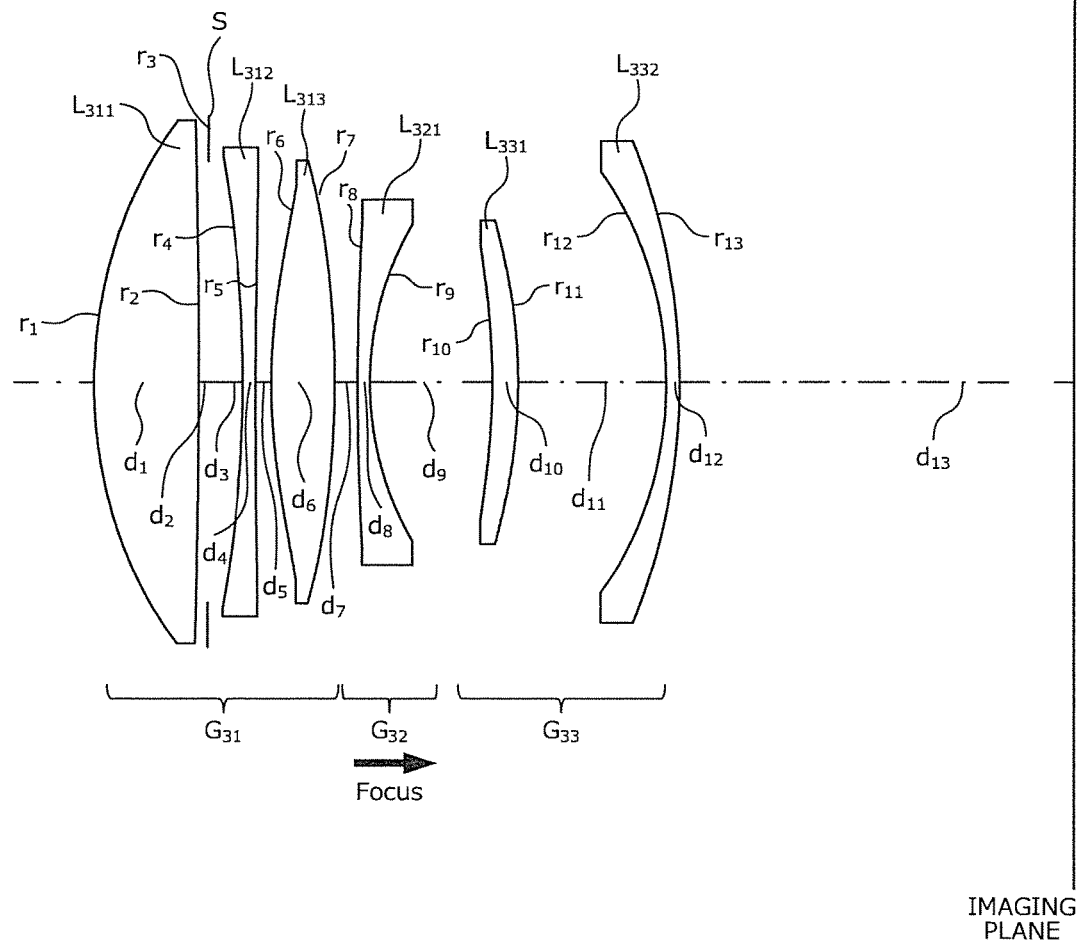
FIG. 5 is a diagram depicting, along the optical axis, a configuration of the inner focus lens according to a third embodiment.

FIG. 5 is a diagram depicting, along the optical axis, a configuration of the inner focus lens according to a third embodiment. FIG. 5 depicts a focus state for an object at infinity. The inner focus lens includes sequentially from the object side, a first lens group $G_{31}$ having a positive refractive power, a second lens group $G_{32}$ having a negative refractive power, and a third lens group $G_{33}$ having a negative refractive power.

The first lens group $G_{31}$ includes sequentially from the object side, a positive lens $L_{311}$, the aperture stop S determining a given diameter, a negative lens $L_{312}$, and a positive lens $L_{313}$. Both surfaces of the positive lens $L_{313}$ are aspheric.

The second lens group $G_{32}$ is configured by a negative lens $L_{321}$. Both surfaces of the negative lens $L_{321}$ are aspheric. The second lens group $G_{32}$ is moved along the optical axis from the object side to the image side, whereby focusing from a focus state for an object at infinity to a focus state for the minimum object distance is performed.

The third lens group $G_{33}$ includes sequentially from the object side, a positive lens $L_{331}$ (front sub-lens group) and a negative lens $L_{332}$ (rear sub-lens group). Both surfaces of the positive lens $L_{331}$ are aspheric. An air gap is formed between the positive lens $L_{331}$ and the negative lens $L_{332}$.

In the inner focus lens according to the third embodiment, the positive lens $L_{313}$ included in the first lens group $G_{31}$ or the positive lens $L_{331}$ included in the third lens group $G_{33}$ is moved in a direction orthogonal to the optical axis, whereby stabilization correction is performed.

Here, various values related to the inner focus lens according to the third embodiment are given.

(Lens Data)

| | | | |
|---|---|---|---|
| $r_1 = 16.4363$ | $d_1 = 5.5000$ | $ne_1 = 1.49845$ | $ve_1 = 81.21$ |
| $r_2 = -300.0000$ | $d_2 = 0.5000$ | | |
| $r_3 = \infty$ (aperture stop) | $d_3 = 1.8212$ | | |
| $r_4 = -44.7468$ | $d_4 = 0.7000$ | $ne_2 = 1.72310$ | $ve_2 = 29.27$ |
| $r_5 = 373.5699$ | $d_5 = 0.8417$ | | |
| $r_6 = 20.8910$ (aspheric surface) | $d_6 = 3.3714$ | $ne_3 = 1.49856$ | $ve_3 = 81.16$ |
| $r_7 = -33.7365$ (aspheric surface) | $d_7 = D(7)$ (variable) | | |
| $r_8 = 90.3752$ (aspheric surface) | $d_8 = 0.6500$ | $ne_4 = 1.58547$ | $ve_4 = 59.22$ |
| $r_9 = 11.0161$ (aspheric surface) | $d_9 = D(9)$ (variable) | | |
| $r_{10} = -23.8098$ (aspheric surface) | $d_{10} = 1.3706$ | $ne_5 = 1.82917$ | $ve_5 = 23.86$ |
| $r_{11} = -18.3476$ (aspheric surface) | $d_{11} = 7.8919$ | | |
| $r_{12} = -13.3351$ | $d_{12} = 0.7000$ | $ne_6 = 1.49845$ | $ve_6 = 81.21$ |
| $r_{13} = -22.5577$ | $d_{13} = Bf$ | | |

Constant of the Cone (k) and Aspheric Coefficients ($A_4$, $A_6$, $A_8$, $A_{10}$)

(Sixth Order)

$k = 0$,
$A_4 = -6.66384 \times 10^{-5}$, $A_6 = -3.55330 \times 10^{-7}$,
$A_8 = 6.24915 \times 10^{-10}$, $A_{10} = -8.69024 \times 10^{-12}$ (Seventh Order)

$k = 0$,
$A_4 = 4.36278 \times 10^{-6}$, $A_6 = -1.41704 \times 10^{-7}$,
$A_8 = -1.53397 \times 10^{-10}$, $A_{10} = -3.28298 \times 10^{-12}$ (Eighth Order)

$k = 0$,
$A_4 = -1.17365 \times 10^{-5}$, $A_6 = -9.52960 \times 10^{-8}$,
$A_8 = 5.84886 \times 10^{-10}$, $A_{10} = -3.14094 \times 10^{-12}$ -continued (Lens Data)

(Ninth Order)

$k = 0$,
$A_4 = -9.90628 \times 10^{-6}$, $A_6 = -6.68574 \times 10^{-7}$,
$A_8 = 8.71141 \times 10^{-9}$, $A_{10} = -6.97618 \times 10^{-11}$ (Tenth Order)

$k = 0$,
$A_4 = 8.76623 \times 10^{-5}$, $A_6 = -4.76558 \times 10^{-7}$,
$A_8 = 1.66193 \times 10^{-8}$, $A_{10} = -8.96128 \times 10^{-11}$ (Eleventh Order)

$k = 0$,
$A_4 = 5.77887 \times 10^{-5}$, $A_6 = -5.30380 \times 10^{-7}$,
$A_8 = 1.24226 \times 10^{-8}$, $A_{10} = -7.91033 \times 10^{-11}$ (Focal State Data)

| | Infinity | Minimum Object Distance (object distance) |
|---|---|---|
| D(7) | 1.2117 | 3.0915 |
| D(9) | 6.4767 | 4.5969 |
| f (focal length of optical system overall) | 58.5031 | 46.1351 |
| F no. (F number) | 2.8840 | 3.0166 |
| ω (half angle of view) | 18.4621 | 17.3034 |
| Y (image height) | 21.63 | 21.63 |
| Bf (back focus) | 20.1130 | 20.1130 |

(Values Related to Conditional Expression (1))

f3 (focal length of third lens group $G_{33}$ at focus state for object at infinity) = −400.0000
f3/f = −6.84

(Values Related to Conditional Expression (2))

f1 (focal length of first lens group $G_{31}$ at focus state for object at infinity) = 21.4980
f1/f = 0.37

(Values Related to Conditional Expression (3))

βinf (paraxial magnification of second lens group $G_{32}$ at focus state for object at infinity) = 2.73
βmod (paraxial magnification of second lens group $G_{32}$ at focus state for minimum object distance) = 2.65
βinf/βmod = 1.03

(Values Related to Conditional Expression (4))

R1 (radius of curvature of surface at air interface on object side of negative lens $L_{332}$) = −13.3351
R2 (radius of curvature of surface at air interface on image side of negative lens $L_{332}$) = −22.5577
(R1 + R2)/(R1 − R2) = −3.89

(Values Related to Conditional Expression (5))

L1s (axial distance from surface farthest on object side of first lens group $G_{31}$ to aperture stop S) = 6.0000
L (overall length of optical system) = 51.1482
L1s/L = 0.12

(Values Related to Conditional Expression (6))

f2 (focal length of second lens group $G_{32}$ at focus state for object at infinity) = −21.4928
f2/f = −0.37

(Values Related to Conditional Expression (7))
When moved lens group (stabilizing group) is positive lens $L_{313}$ of first lens group $G_{31}$ βp (transverse magnification of lens group moved in direction orthogonal to optical axis) = 0.37

-continued (Lens Data)

βr (composite transverse magnification of lenses disposed
farther on image side than lens group moved in direction
orthogonal to optical axis) = 2.72
(1 − βp) × βr = 1.72
When moved lens group (stabilizing group) is positive lens
$L_{331}$ of third lens group $G_{33}$ βp (transverse magnification of lens group moved in
direction orthogonal to optical axis) = 0.76
βr (composite transverse magnification of lenses disposed
farther on image side than lens group moved in direction
orthogonal to optical axis) = 1.32
(1 − βp) × βr = 0.32
(Values Related to Conditional Expression (8))

υen (Abbe number for e-line of negative lens $L_{332}$) = 81.21
(Values Related to Conditional Expression (9))

R21 (radius of curvature of surface farthest on object side
of negative lens $L_{321}$) = 90.3752
R22 (radius of curvature of surface farthest on image side
of negative lens $L_{321}$) = 11.0161
(R21 + R22)/(R21 − R22) = 1.28

FIG. 6 is a diagram of various types of aberration occurring in the inner focus lens according to the third embodiment. In the diagram, curves depict wavelength aberration corresponding to the e-line (λ=546.074 nm). S and M shown with respect to astigmatism, respectively indicate aberration at the sagittal imaging plane and at the meridonal imaging plane.

Among the values for each of the embodiments, $r_1$, $r_2$, . . . indicate the radius of curvature of lens surfaces, diaphragm surface, etc.; $d_1$, $d_2$, . . . indicate the thickness of the lenses, the diaphragm, etc. or the interval between the surfaces thereof; $ne_1$, $ne_2$, . . . indicate the refraction index of the lenses with respect to the e-line (λ=546.074 nm); and $ve_1$, $ve_2$, . . . indicate the Abbe number for the e-line (λ=587.56 nm) of the lenses. Lengths are indicated in units of "mm"; and angles are indicated in "degrees".

Each aspheric surface shape above is expressed by the equation below; where, Z is the depth of the aspheric surface, c(1/r) is curvature; h is the height from the optical axis; k is the constant of the cone; $A_4$, $A_6$, $A_8$, $A_{10}$ are respectively fourth order, sixth order, eighth order, and tenth order aspheric coefficients; and the travel direction of light is assumed to be positive.

$$Z = \frac{ch^2}{1 + \sqrt{1-(1+k)c^2h^2}} + A_4h^4 + A_6h^6 + A_8h^8 + A_{10}h^{10}$$

In the embodiments, an example of an inner focus lens having focal lengths accommodating wide angles to standard angles of view by a 35 mm film camera conversion has been given. The inner focus lens of the embodiments facilitates reductions in the size and weight of the focusing group and therefore, can favorably perform high-speed autofocus processing, essential for video filming. Further, since the distance that the stabilizing group is moved during stabilization correction can be suppressed, increases in the optical system diameter can be suppressed. In particular, by satisfying the conditional expressions above, an inner focus lens that is optimal for video filming, is compact, and has high imaging performance at wide angles can be realized.

The inner focus lens according to the present embodiment is useful for compact imaging apparatuses such as still cameras, video cameras, etc. and in particular, is optimal for imaging apparatuses for video filming.

According to the embodiments, a high imaging performance inner focus lens for which reduction of the overall length and diameter is achieved can be provided.

According to the embodiments, an inner focus lens that has focal lengths accommodating wide angles to standard angles of view and high imaging performance can be provided.

According to the embodiments, variations in the angle of view consequent to focusing are suppressed, enabling improved imaging performance.

According to the embodiments, the diameter of a lens near the imaging plane is reduced and axial as well as off axis aberration (particularly, distortion) can be favorably corrected.

According to the embodiments, the diameter of the third lens group (lens farthest on the image side) is reduced and off axis coma can be favorably corrected.

According to the embodiments, the diameters of the front lens and the rear lens are reduced while maintaining imaging performance, enabling size reductions of the optical system to be facilitated.

According to the embodiments, reductions in the size and weight of the second lens group, which is the focusing group, enables an inner focus lens to be provided that is applicable to video filming.

According to the embodiments, the overall length of the optical system can be reduced and imaging performance can be improved.

According to the embodiments, a compact inner focus lens can be provided that has a stabilization correction function. In particular, the distance that the stabilizing group is moved during stabilization correction can be suppressed, the diameter of the optical system can be reduced, and stabilization correction performance can be improved.

According to the embodiments, reductions in the size and weight of the simple lens element having a negative refractive power and disposed farthest on the image side of the third lens group become easy and chromatic difference of magnification can be favorably corrected.

According to the present invention, an inner focus lens having high imaging performance and for which reduction of the overall length and diameter is achieved can be provided. Furthermore, an inner focus lens that has focal lengths accommodating wide angles to standard angles of view and high imaging performance can be provided.

According to the present invention, a compact inner focus lens that is optimal for video filming can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2014-039818 filed in Japan on Feb. 28, 2014.

What is claimed is:

1. An inner focus lens comprising sequentially from an object side:
   a first lens group having a positive refractive power;
   a second lens group having a negative refractive power; and a third lens group having a negative refractive power, and consisting of, sequentially from the object side:

a front sub-lens group having a positive refractive power, and a rear sub-lens group having a negative refractive power; and an axial air gap that is widest in the third lens group is formed between the front sub-lens group and the rear sub-lens group, the second lens group is configured to move along an optical axis, whereby focusing from a focus state for an object at infinity to a focus state for a minimum object distance is performed, and the inner focus lens satisfies a conditional expression (1) $-29.0 \leq f3/f \leq -5.4$, where f3 is a focal length of the third lens group at the focus state for an object at infinity and f is a focal length of the optical system overall of the inner focus lens at the focus state for an object at infinity.

2. The inner focus lens according to claim 1, wherein the inner focus lens satisfies a conditional expression (2) $0.18 \leq f1/f \leq 0.99$, where f1 is a focal length of the first lens group at the focus state for an object at infinity.

3. The inner focus lens according to claim 1, wherein the inner focus lens satisfies a conditional expression (3) $0.51 \leq \beta \text{inf}/\beta \text{ mod} \leq 2.07$, where βinf is paraxial magnification of the second lens group at the focus state for an object at infinity and β mod is paraxial magnification of the second lens group at the focus state for the minimum object distance.

4. The inner focus lens according to claim 1, wherein the third lens group includes a simple lens element having a negative refractive power and disposed farthest on an image side, and the inner focus lens satisfies a conditional expression (4) $(R1+R2)/(R1-R2) \leq 0.0$, where R1 is radius of curvature of a surface at an air interface on the object side of the simple lens element having a negative refractive power and R2 is radius of curvature of a surface at an air interface on the image side of the simple lens element having a negative refractive power.

5. The inner focus lens according to claim 4, wherein the simple lens element having a negative refractive power and disposed farthest on the image side of the third lens group is configured by a glass material, and the inner focus lens satisfies a conditional expression (8) $30 \leq \nu\text{en}$, where νen is an Abbe number for e-line of the simple lens element having a negative refractive power and disposed farthest on the image side of the third lens group.

6. The inner focus lens according to claim 1, wherein the inner focus lens satisfies a conditional expression (5) $0.01 \leq L1s/L \leq 0.53$, where L1s is an axial distance from a surface farthest on the object side of the first lens group to an aperture stop and L is an overall optical system length of the inner focus lens.

7. The inner focus lens according to claim 6, wherein the overall optical system length is an air-conversion optical path length from an apex of a lens surface farthest on the object side to an imaging plane.

8. The inner focus lens according to claim 1, wherein the second lens group is configured by a simple lens element having a negative refractive power.

9. The inner focus lens according to claim 1, wherein the inner focus lens satisfies a conditional expression (6) $-2.12 \leq f2/f \leq -0.18$, where f2 is a focal length of the second lens group at the focus state for an object at infinity.

* * * * *